United States Patent [19]

Koeda et al.

[11] Patent Number: 5,746,494
[45] Date of Patent: May 5, 1998

[54] ILLUMINATING APPARATUS OF ENDOSCOPE

[75] Inventors: Takashi Koeda; Hiroshi Sano; Hirohisa Ueda; Kunitoshi Ikeda; Kunikiyo Kaneko; Rensuke Adachi, all of Tokyo, Japan

[73] Assignee: Asahi Kogaku Kogyo Kabushiki Kaisha, Tokyo, Japan

[21] Appl. No.: 557,821

[22] Filed: Nov. 14, 1995

[30] Foreign Application Priority Data

Nov. 22, 1994 [JP] Japan .................. 6-287002
Jun. 9, 1995 [JP] Japan .................. 7-142306

[51] Int. Cl.⁶ ........................................ F21V 8/00
[52] U.S. Cl. ................ 362/32; 362/327; 362/268; 362/255; 362/256; 385/33; 385/117; 385/119
[58] Field of Search ................... 362/32, 268, 277, 362/804, 255, 256, 327, 307, 308, 309, 329; 385/118, 117, 119, 33, 43; 600/177, 178, 182, 108

[56] References Cited

U.S. PATENT DOCUMENTS

| | | | |
|---|---|---|---|
| 4,106,078 | 8/1978 | Inoue | 362/32 |
| 4,281,366 | 7/1981 | Wurster et al. | 362/32 |
| 4,322,129 | 3/1982 | Takahashi et al. . | |
| 4,823,244 | 4/1989 | Alaybayoglu et al. | 362/32 |
| 4,874,220 | 10/1989 | Yamagata . | |
| 4,883,333 | 11/1989 | Yanez | 362/32 |
| 4,887,190 | 12/1989 | Sadamune et al. | 362/32 |
| 5,036,834 | 8/1991 | Sugiyama et al. . | |
| 5,143,435 | 9/1992 | Kikuchi | 362/32 |
| 5,170,454 | 12/1992 | Kanai | 385/88 |
| 5,193,135 | 3/1993 | Miyagi | 385/117 |
| 5,237,403 | 8/1993 | Sugimoto et al. . | |
| 5,491,765 | 2/1996 | Matsumoto | 385/33 |

FOREIGN PATENT DOCUMENTS

| | | |
|---|---|---|
| 50-12586 | 2/1975 | Japan . |
| 55-114601 | 8/1980 | Japan . |
| 57-20728 | 2/1982 | Japan . |

OTHER PUBLICATIONS

Brochure entitled "T-1 Halogen Lamps", a publication of Welch Allyn, undated.

*Primary Examiner*—Thomas M. Sember
*Attorney, Agent, or Firm*—Greenblum & Bernstein, P.L.C.

[57] ABSTRACT

An illuminating apparatus of an endoscope having a bulb disposed to face an entrance end surface of a light guide for illumination to supply illuminating light to the light guide. A concave mirror surrounds side and rear portions of the bulb to converge light emitted peripherally from the bulb in the vicinity of the entrance end surface of the light guide. A convex lens is formed at the distal end of the bulb to allow light emitted forwardly and obliquely forward from the bulb to be incident on the entrance end surface of the light guide.

21 Claims, 6 Drawing Sheets

ILLUMINATING APPARATUS OF ENDOSCOPE

BACKGROUND OF THE INVENTION

The present invention relates to subject matter contained in Japanese Patent Application No. 6-287002 (filed on Nov. 22, 1994) and Japanese Patent Application No. 7-142306 (filed on Jun. 9, 1995), which are expressly incorporated herein by reference in their entireties.

1. Field of the Invention

The present invention relates to an illuminating apparatus of an endoscope which is designed so that a bundle of light rays emitted from a light source lamp is converged in the vicinity of an entrance end surface of a light guide for illumination so as to enter the light guide.

2. Description of the Prior Art

In general, an endoscope contains a light guide fiber bundle to transmit light for illuminating an object. A bundle of light rays emitted from a light source lamp is converged in the vicinity of an entrance end surface of the light guide fiber bundle so as to enter it.

To converge a bundle of light rays emitted from the light source lamp, various types of optical systems are used. When there is not sufficient space in an endoscope, a spheroidal mirror is used, and the light-emitting part of the light source lamp is disposed at the primary focus of the spheroidal mirror. The entrance end surface of the light guide fiber bundle is disposed at the secondary focus of the spheroidal mirror. Consequently, the bundle of light rays emitted from the light source lamp can be converged in the vicinity of the entrance end surface of the light guide fiber bundle by an arrangement of relatively small size.

However, no thorough investigation has heretofore been made as to what kind of spheroidal mirror should be specifically used to minimize the size of the arrangement. For this reason, in portable endoscopes which have a light source apparatus disposed in a control part, and which are demanded to reduce both size and weight requirements to the utmost limits, the size of the illuminating light converging part has not sufficiently been reduced, thus hindering controllability improvements in portable endoscopes.

Many of such portable endoscopes use a small miniature bulb having a diameter of several millimeters as a light source lamp. Since such a miniature bulb has an exceedingly small luminous intensity, light emitted from the miniature bulb must be directed to enter the light guide fiber bundle as efficiently as possible.

However, when a spheroidal mirror is merely disposed around a miniature bulb, light that is emitted obliquely forward from the miniature bulb and not reflected by the spheroidal mirror is wasted because it fails to converge on the entrance end surface of the light guide fiber bundle. Therefore, such an arrangement cannot be said to be efficient. Further, since the quantity of light entering the light guide fiber bundle from a substantially perpendicular direction to the entrance end surface thereof is relatively small, a phenomenon in which the central portion of the observation field becomes dark is likely to occur.

If a convergent lens is additionally disposed between the miniature bulb and the entrance end surface of the light guide fiber bundle, a part of the light that would otherwise be wasted as described above can be made to enter the light guide fiber bundle.

However, since the convergent lens and the miniature bulb cannot be brought extremely close to each other, the convergent lens must be made considerably large in size in order to allow a bundle of light rays emitted directly into the air without being reflected by the spheroidal mirror to enter the convergent lens. Consequently, a large quantity of light is undesirably reflected by the surface of the lens. As a result, the quantity of light entering the light guide fiber bundle can barely be increased.

SUMMARY OF THE INVENTION

An object of the present invention is to provide an illuminating apparatus of an endoscope which is designed so that light that is emitted from a bulb can be efficiently made to enter a light guide without waste, and moreover, it is possible to obtain excellent luminous intensity distribution characteristics.

Another object of the present invention is to provide an illuminating apparatus of an endoscope which makes it possible to realize a reduction in size of an arrangement in which illuminating light that is emitted from a light source lamp is converged in the vicinity of an entrance end surface of a light guide by a spheroidal mirror.

Other objects and advantages of the present invention will become apparent from the following detailed description of illustrated embodiments of the invention.

According to the present invention, there is provided an illuminating apparatus of an endoscope having a bulb which is disposed to face an entrance end surface of a light guide for illumination to supply illuminating light to the light guide. The illuminating apparatus includes a concave mirror for converging light emitted peripherally from the bulb in the vicinity of the entrance end surface of the light guide. The concave mirror surrounds side and rear portions of the bulb. The illuminating apparatus further includes a convex lens for allowing light emitted forward and obliquely forward from the bulb to be incident on the entrance end surface of the light guide. The convex lens is formed at the distal end of the bulb.

BRIEF DESCRIPTION OF THE DRAWINGS

The present invention may be more fully understood from the description of preferred embodiments of the invention set forth below, together with the accompanying drawings, in which.

DESCRIPTION OF THE EMBODIMENTS

Embodiments of the present invention will be described below with reference to the accompanying drawings.

Figure 1:
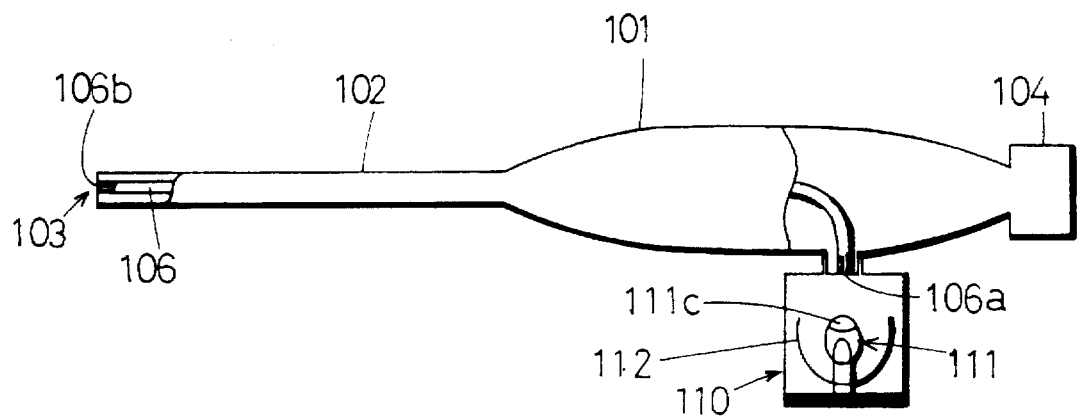
FIG. 1 schematically shows the whole arrangement of a portable endoscope to which a first embodiment of the present invention is applied.

FIG. 1 shows the whole arrangement of a portable endoscope to which a first embodiment of the present invention is applied. In the portable endoscope, a light source apparatus 110 is provided at a control part 101. An insert tube 102 is connected to the control part 101, and a viewing window (not shown) and an illuminating window 103 are provided in the distal end of the insert tube 102.

An image for observation which enters the distal end of the insert tube 102 through the viewing window is transmitted by either a relay optical system or an image guide fiber bundle and is observed as an enlarged image through an eyepiece 104 which projects from the other end of the control part 101.

The insert tube 102 has an illuminating light guide fiber bundle 106 inserted therein to transmit light for illuminating an observation range. An entrance end surface 106a of the light guide fiber bundle 106 is disposed in the control part 101. An exit end surface 106b of the light guide fiber bundle 106 is disposed in the illuminating window 103.

The light source apparatus 110 is detachably attached to the control part 101. When the light source apparatus 110 is attached to the control part 101, a miniature bulb 111 contained in the light source apparatus 110 is set in a position where it faces the entrance end surface 106a of the light guide fiber bundle 106. As a power supply for the miniature bulb 111, a battery (not shown) is used. It should be noted that a light guide other than a fiber bundle may also be used in the present invention.

Figure 2:
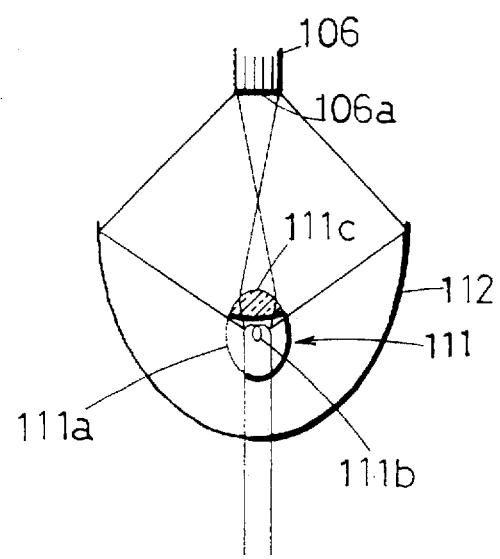
FIG. 2 is a sectional view of a light source part in the first embodiment of the present invention.

FIG. 2 shows a part of the portable endoscope which contains the miniature bulb 111 of the light source apparatus 110. A spheroidal mirror 112 surrounds side and rear portions of the miniature bulb 111 to converge illuminating light emitted peripherally from the miniature bulb 111 in the vicinity of the entrance end surface 106a of the light guide fiber bundle 106.

Accordingly, light that is emitted sidewards and obliquely backward from the miniature bulb 111 is reflected by the spheroidal mirror 112 and converged in the vicinity of the entrance end surface 106a of the light guide fiber bundle 106 to enter the light guide fiber bundle 106.

The miniature bulb 111 includes a transparent glass bulb 111a whose interior is kept oxygen free, and a filament 111b which is sealed in the glass bulb 111a. The distal end portion of the glass bulb 111a is formed into a convex lens 111c so that light that is emitted forward and obliquely forward from the filament 111b is made incident on the entrance end surface 106a of the light guide fiber bundle 106 by the action of the convex lens 111c.

Accordingly, light traveling forward and obliquely forward, which would be emitted directly into space without impinging upon the spheroidal mirror 112 if no convex lens 111c were present, is effectively directed to enter the light guide fiber bundle 106 by the convex lens 111c.

Consequently, light that is emitted from the miniature bulb 111 is allowed to enter the light guide fiber bundle 106 much more efficiently, and illumination of excellent luminous intensity distribution characteristics can be carried out without the conventional problem that the central portion of the observation field becomes undesirably dark.

Figure 3:
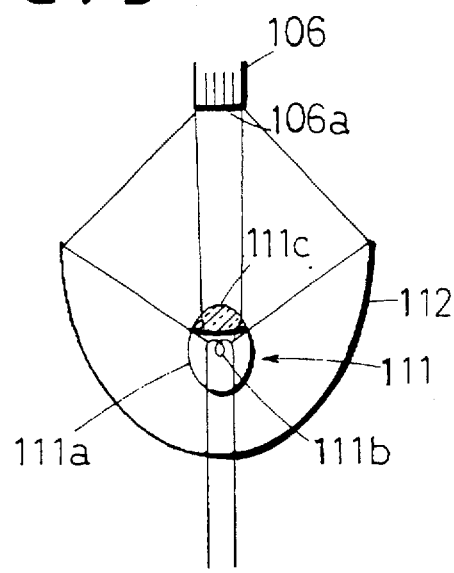
FIG. 3 is a sectional view of a light source part in a second embodiment of the present invention.

With regard to the converging action of the convex lens 111c, the convex lens 111c may be designed so that light is once focused between the convex lens 111c and the entrance end surface 106a of the light guide fiber bundle 106, as shown in FIG. 2. Alternatively, the convex lens 111c may be designed so that light is not focused between the convex lens 111c and the entrance end surface 106a of the light guide fiber bundle 106, as shown in FIG. 3.

Figure 4:
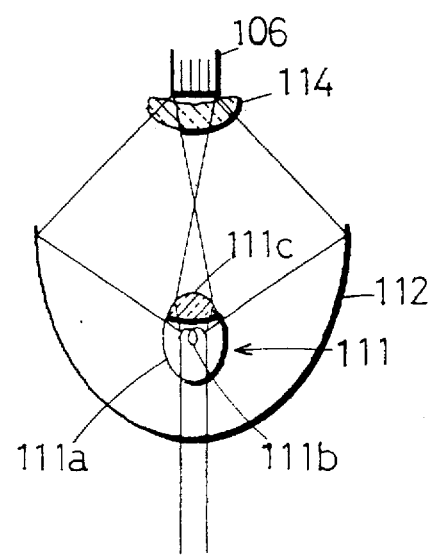
FIG. 4 is a sectional view of a light source part in a third embodiment of the present invention.
Figure 5:
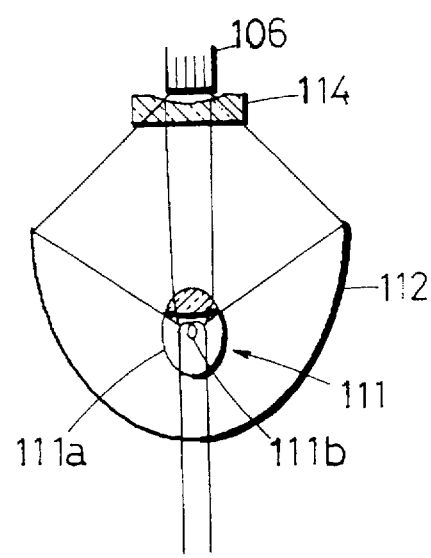
FIG. 5 is a sectional view of a light source part in a fourth embodiment of the present invention.

As shown in FIGS. 4 and 5, an auxiliary lens 114 may be disposed in close proximity to the entrance end surface 106a of the light guide fiber bundle 106 in the above-described arrangement to adjust the direction of light rays from the miniature bulb 111 which are to be incident on the entrance end surface 106a.

By disposing the auxiliary lens 114 as described above, the incidence angle of light entering the light guide fiber bundle 106 can be adjusted so as to create a favorable condition. Thus, even more excellent luminous intensity distribution characteristics can be obtained. It should be noted that a concave lens is generally suitable for use as the auxiliary lens 114, but any type of lens may be used according to need.

Thus, according to the present invention, a spheroidal mirror is provided so that light that is peripherally emitted from a miniature bulb is converged in the vicinity of the entrance end surface of a light guide. Accordingly, light that is peripherally emitted from the miniature bulb is effectively directed to enter the light guide. In addition, since the distal end portion of the miniature bulb is formed into a convex lens, most of light rays which are not reflected by the spheroidal mirror toward the entrance end surface of the light guide enter the convex lens formed at the distal end of the miniature bulb and are effectively made incident on the entrance end surface of the light guide by the converging action of the convex lens. Therefore, light that is emitted from the miniature bulb is allowed to enter the light guide much more efficiently, and excellent luminous intensity distribution characteristics can be obtained.

Figure 6:
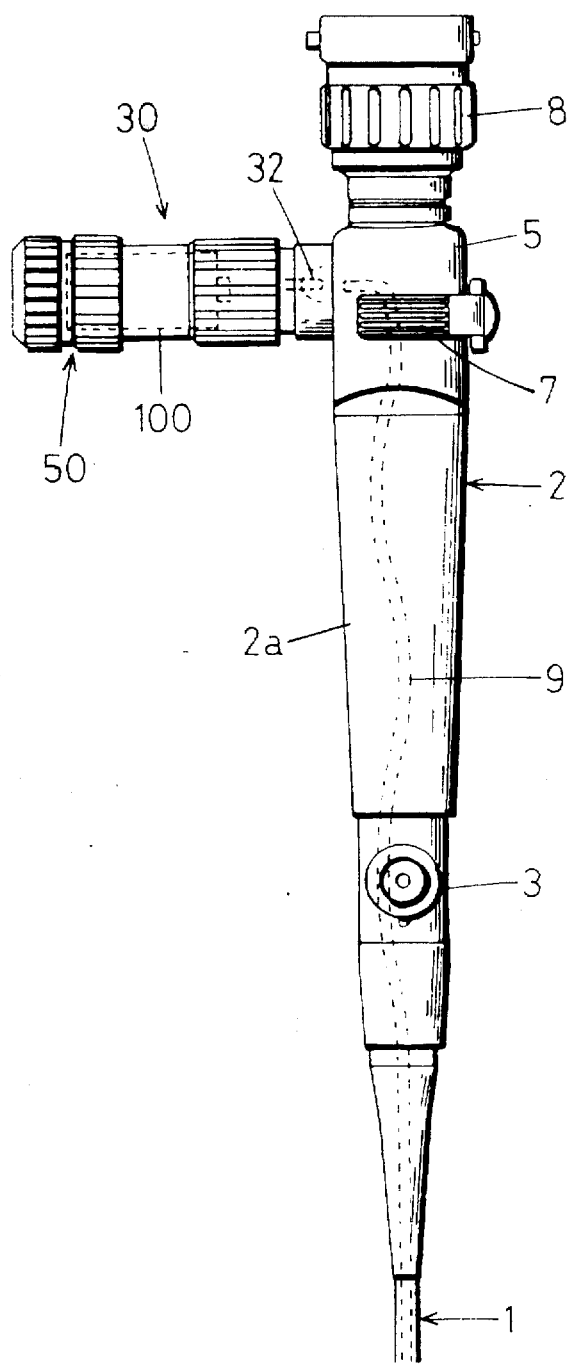
FIG. 6 is a rear view of a portable endoscope to which a fifth embodiment of the present invention is applied.

FIG. 6 is a rear view of a portable endoscope to which a fifth embodiment of the present invention is applied. FIG. 6 particularly shows a control part 2 and neighboring constituent elements of the portable endoscope. The portable endoscope has an insert part 1 which is armored with a flexible tube. The proximal end of the insert part 1 is connected to the lower end portion of the control part 2.

About three-fourths of the bottom of the control part 2 serves as a grip portion 2a. A forceps inlet (not shown) is provided between the grip portion 2a and the insert part 1 so as to project obliquely forward. A pressure control valve 3 is used to control the pressure in the endoscope, which is formed into an airtight structure.

The control part 2 has a control mechanism portion 5 above the grip portion 2a. The control mechanism portion 5 has a bending control lever 7 which is disposed thereon so as to extend from one side to the rear thereof to effect bending control of a remote-controlled bendable portion (not shown) which is formed at the distal end of the insert part 1. In addition, an eyepiece 8 is provided on the top of the control mechanism portion 5.

An illuminating light guide fiber bundle 9 for transmitting light for illuminating an object has an entrance end portion thereof disposed in the control mechanism portion 5, and extends through the insert part 1 and the grip portion 2a of the control part 2. The exit end portion of the light guide fiber bundle 9 is disposed in the distal end of the insert part 1 so that an object can be illuminated with light emitted from the exit end portion of the light guide fiber bundle 9.

An illuminating light supply unit 30 for supplying illuminating light to the light guide fiber bundle 9 is detachably attached to a side of the control mechanism portion 5.

The illuminating light supply unit 30 contains a light source lamp 32 for emitting illuminating light which is to be supplied to the light guide fiber bundle 9, and a battery 100 as a power supply for lighting the light source lamp 32. The battery 100 may be any type of battery, e.g. a dry battery or a rechargeable nickel-cadmium battery.

The battery 100 can be replaced by removing a cap 50 which is detachably attached to the outer end of the illuminating light supply unit 30. An AC/DC adapter may be connected to the illuminating light supply unit 30 in place of the battery 100.

Figure 7:
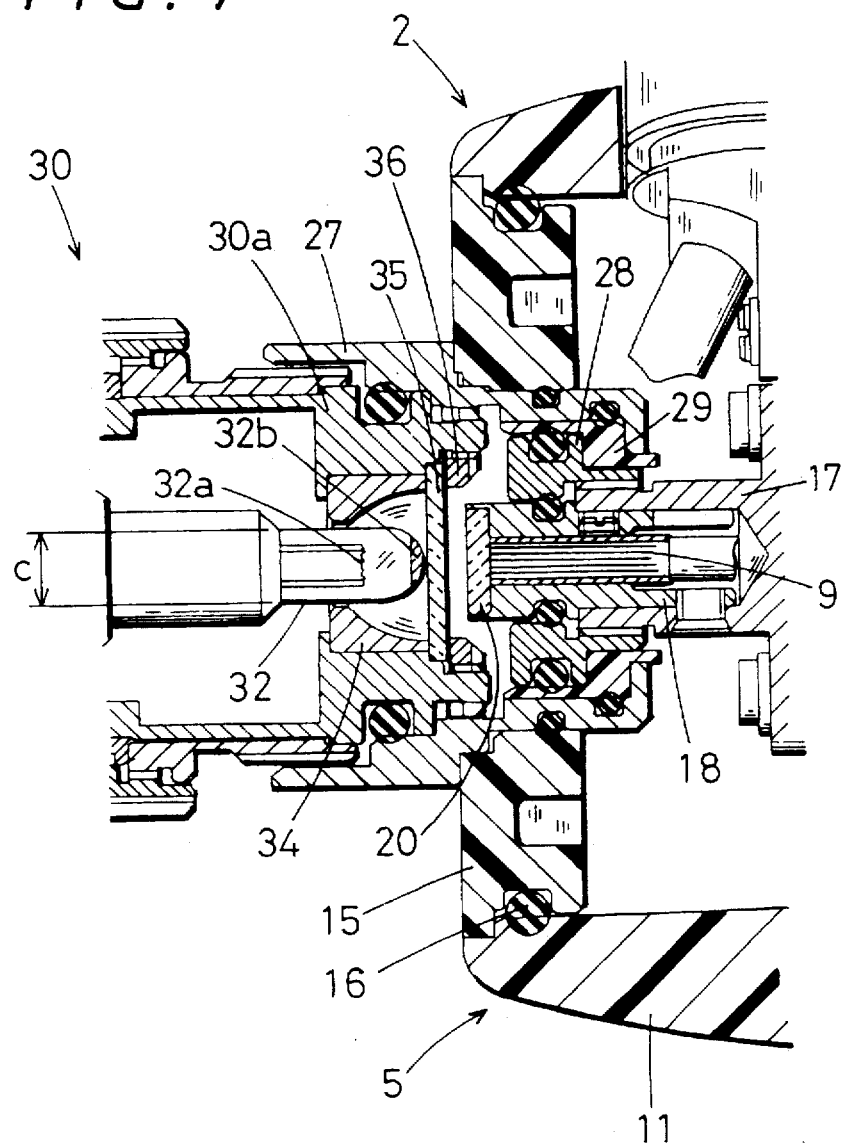
FIG. 7 is a fragmentary sectional side view showing a part in which a bundle of illuminating light rays from a light source lamp is directed to enter a light guide in the fifth embodiment of the present invention.

FIG. 7 shows the joint between the control part 2 and the illuminating light supply unit 30 and its vicinities. The control mechanism portion 5 of the control part 2 is armored with a casing 11 made of an electrically insulating plastic material.

A cover 15 which is made of an electrically insulating plastic material is fitted in a relatively large opening provided in a side of the casing 11, and a sealing O-ring 16 is attached to the fitting surface of the cover 15 to prevent water from entering the inside of the control part 2 through the gap between the cover 15 and the peripheral wall of the opening.

In addition, a detent is formed in the area of fit between the cover 15 and the casing 11 to prevent the cover 15 and the casing 11 from rotating relative to each other. It should be noted that, although the O-ring 16 is squeezed when it is disposed in the area of fit between the cover 15 and the casing 11, the cross-section of the O-ring 16 in a natural state before it is squeezed is shown in the figure (the same shall apply hereinafter).

A support cylinder 17 is disposed on the central axis of a through-hole formed in the center of the cover 15. The proximal end portion of the support cylinder 17 is secured to a metal frame (not shown) in the control part 2. A light guide mounting cylinder 18 is screwed to the support cylinder 17. The distal end portion of the light guide mounting cylinder 18 projects outwardly from the projecting end of the support cylinder 17.

The entrance end portion of the light guide fiber bundle 9 is secured with a screw at the central axis position in the light guide mounting cylinder 18. A plane-parallel cover glass 20 is bonded to the projecting end portion of the light guide mounting cylinder 18 in a watertight manner and in close contact with the entrance end surface of the light guide fiber bundle 9.

A unit receiving socket 27 is fitted in a through-hole which is formed in the cover 15 such that the socket 27 projects outwardly to receive (connect) the illuminating light supply unit 30, which is detachably attached to the control part 2. The unit receiving socket 27 is made of a stainless steel, for example, and secured by being pressed inwardly with a metallic fastening ring 28 which is thread-engaged with the support cylinder 17.

It should be noted that an insulating cylinder 29, which is made of an electrically insulating plastic material, is interposed between the unit receiving socket 27 and the fastening ring 28 to prevent these members from coming in contact with each other. Thus, the unit receiving socket 27 and the fastening ring 28 are electrically insulated from each other.

It should be noted that a sealing O-ring is disposed in the area of fit between each pair of mating members disposed inside the bore of the cover 15, thereby forming the control part 2 into a watertight structure which prevents water from externally entering the control part 2 through any portion thereof. The insert part 1 is similarly formed into a watertight structure, as a matter of course.

The illuminating light supply unit 30 has a straight cylindrical configuration as a whole. The light source lamp 32, which is inserted in a socket (not shown), is disposed in the axial end portion of the illuminating light supply unit 30.

As the light source lamp 32, a miniature bulb with a filament 32a which emits light by being supplied with an electric current is used. A convex lens 32b is formed at the distal end of the light source lamp 32. Thus, the light source lamp 32 is formed in the shape of a cylinder which is closed at the distal end by the convex lens 32b.

In addition, a spheroidal mirror 34 is rigidly bonded to a unit casing 30a to surround the light source lamp 32 so as to converge illuminating light emitted from the light source lamp 32 toward the entrance end surface of the light guide fiber bundle 9.

In addition, a transparent cover glass 35 is secured to the front end of the spheroidal mirror 34 by a retaining nut 36. The outer peripheral surface of the cover glass 35 is coated with a sealing compound to prevent water from externally entering the illuminating light supply unit 30.

The light source lamp 32 is disposed on the major axis of the spheroidal mirror 34 so that the surface of the convex lens 32b is placed in contact with the inner surface of the cover glass 35, and that the filament 32a lies at the primary focus of the spheroidal mirror 34.

The entrance end surface of the light guide fiber bundle 9 is disposed at the secondary focus of the spheroidal mirror 34. It should be noted that the system is corrected for errors such as deviation of the optical path length caused by the cover glasses 20 and 35.

An external thread is formed on the outer peripheral surface of the distal end portion of the unit casing 30a. The external thread is adapted to engage with an internal thread which is formed on the inner peripheral surface of the unit receiving socket 27. Thus, by engaging the two threads with each other, the illuminating light supply unit 30 is connected to the control part 2.

Consequently, among illuminating light emitted from the filament 32a of the light source lamp 32, a bundle of light rays axially emitted is converged on the entrance end surface of the light guide fiber bundle 9 by the action of the convex lens 32b at the distal end of the light source lamp 32, and a bundle of light rays peripherally emitted is reflected by the spheroidal mirror 34 to converge on the entrance end surface of the light guide fiber bundle 9. In this way, the illuminating light is directed to enter the light guide fiber bundle 9 and transmitted to the distal end of the insert part 1.

Figure 8:
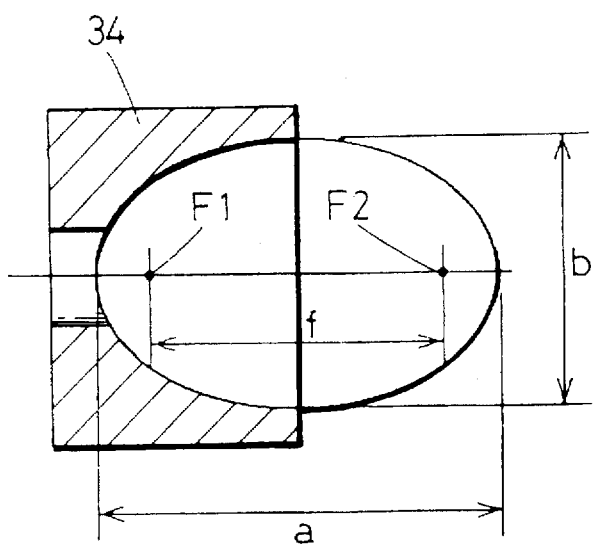
FIG. 8 is a schematic sectional side view illustrating a spheroidal mirror in the fifth embodiment of the present invention.

As shown in FIG. 8, the spheroidal mirror 34 in this embodiment is formed so that the following relation holds:

$$b \leq f < a$$

where:
  a is the major axis diameter of a spheroid defined by the spheroidal mirror 34; b is the minor axis diameter of the spheroid; and f is the distance between two foci F1 and F2 of the spheroid.

For example, the major axis a, the minor axis b, and the distance f are set in the ratio of b:f:a=7:8:11.

Figure 9:
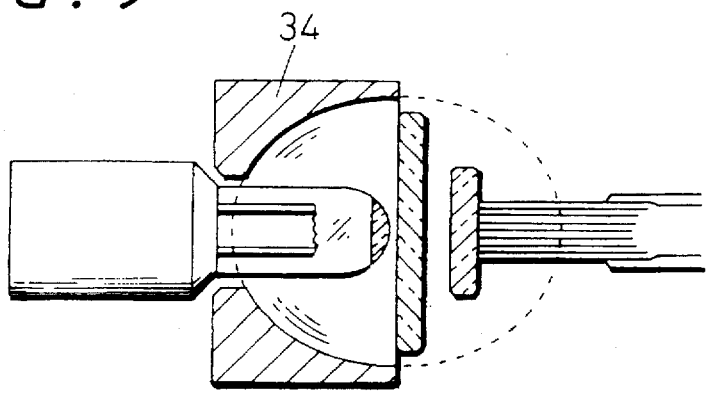
FIG. 9 is a sectional side view of an illuminating light ray bundle entrance part in which a spheroidal mirror having a relatively large diameter is used.
Figure 10:
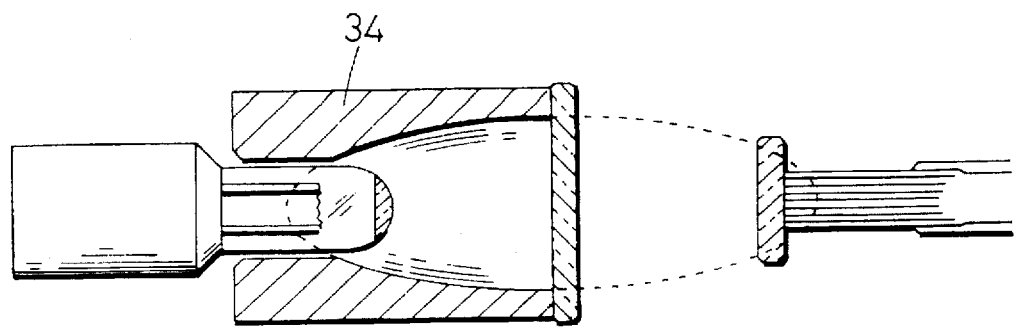
FIG. 10 is a sectional side view of an illuminating light ray bundle entrance part in which a relatively long spheroidal mirror is used.

If f is reduced, as shown in FIG. 9, the diameter of the spheroidal mirror 34 becomes undesirably large, whereas, if f is increased, as shown in FIG. 10, the length of the spheroidal mirror 34 becomes undesirably long. Therefore, the spheroidal mirror 34 should be formed so that the relation of b≦f<a holds. By satisfying the condition, the spheroidal mirror 34 can be formed in a compact structure as a whole, with a moderate diameter and a moderate length.

As shown in FIG. 7, the light source lamp 32 is not entirely, but partially inserted into the spheroidal mirror 34 from behind the latter. Accordingly, the filament 32a can be accurately set at the primary focus of the spheroidal mirror 34, which is formed in a compact structure.

Further, the relation between the diameter c of the light source lamp 32 in a direction perpendicular to the axis and the minor axis diameter b of the spheroidal mirror 34 (i.e. the diameter of the opening) is set so as to satisfy the following condition:

$$1.5 < (b/c) < 3.0$$

In this embodiment, the relation between b and c is set at $(b/c)=2$.

If the value of (b/c) is increased, the spheroidal mirror 34 becomes undesirably large in size, resulting in an increase in the overall size of the apparatus. If the value of (b/c) is reduced, there is an increase in the quantity of illuminating light lost without being reflected by the spheroidal mirror 34. Therefore, the condition of 1.5<(b/c)<3.0 should be satisfied. If (b/c) is set within the range of the above condition, it is possible to reduce the loss of illuminating light while minimizing the size of the spheroidal mirror 34.

It should be noted that the converging position of illuminating light reflected by the spheroidal mirror 34 does not necessarily need to be accurately coincident with the center of the entrance end surface of the light guide fiber bundle 9, but may be slightly off the center of the entrance end surface according to various optical conditions.

The present invention may be applied to illuminating apparatuses of various endoscopes in addition to portable endoscopes.

Thus, according to the present invention, the spheroidal mirror can be formed in a compact structure as a whole, with a moderate diameter and a moderate length, by satisfying the condition of b≦f<a, where a is the major axis diameter of the spheroidal mirror, b is the minor axis diameter of the spheroidal mirror, and f is the distance between two foci of the spheroidal mirror. Thus, it is possible to reduce the size and weight of an arrangement for converging illuminating light emitted from a light source lamp in the vicinity of the entrance end surface of a light guide by a spheroidal mirror..

While the invention has been described by reference to specific embodiments chosen for purposes of illustration, it should be apparent that numerous modifications could be made thereto by those skilled in the art without departing from the basic concept and scope of the invention.

We claim:

1. An illuminating apparatus of an endoscope having a bulb for supplying illuminating light to a light guide for illumination, said bulb being disposed to face an entrance end surface of said light guide, said illuminating apparatus comprising:

a concave mirror for converging light emitted peripherally from said bulb, said concave mirror converging said light in a vicinity of said entrance end surface of said light guide, and said concave mirror surrounding side and rear portions of said bulb; and a convex lens for allowing light emitted forward and obliquely forward from said bulb to be incident on said entrance end surface of said light guide, said convex lens being formed integrally with said bulb at a distal end of said bulb.

2. An illuminating apparatus according to claim 1, wherein an entrance end portion of said light guide is disposed in a control part of said endoscope.

3. An illuminating apparatus according to claim 2, wherein a part which includes said bulb and said concave mirror is detachable with respect to said control part.

4. An illuminating apparatus according to claim 3, wherein said bulb uses a battery as a power supply, said battery being detachable with respect to said control part, together with said bulb and said concave mirror.

5. An illuminating apparatus according to claim 1, wherein light emitted from said bulb is once focused between said convex lens and said entrance end surface of said light guide by said convex lens.

6. An illuminating apparatus according to claim 1, wherein light emitted from said bulb and passing through said convex lens is not focused between said convex lens and said entrance end surface of said light guide.

7. An illuminating apparatus according to claim 1, further comprising a lens for adjusting a direction of light rays from said bulb which are to enter said light guide, said lens being disposed in close proximity to said entrance end surface of said light guide.

8. An illuminating apparatus according to claim 1, wherein said concave mirror is a spheroidal mirror.

9. An illuminating apparatus according claim 8, wherein said bulb is disposed on a major axis of said spheroidal mirror, and a light emitting part of said bulb is disposed at a one of two foci of said spheroidal mirror.

10. An illuminating apparatus according to claim 9, wherein the following relation holds:

$$b \leq f < a$$

where:

a is a or axis diameter of said spheroidal mirror, b is a minor axis diameter of said spheroidal mirror, and f is a distance between said two foci of said spheroidal mirror.

11. An illuminating apparatus according to claim 10, wherein said major axis diameter a of said spheroidal mirror, said minor axis diameter b of said spheroidal mirror, and said distance f between said two foci are related to each other as follows:

$$b:f:a = 7:8:11.$$

12. An illuminating apparatus according to claim 10, wherein said bulb is partially inserted into said spheroidal mirror from behind said spheroidal mirror.

13. An illuminating apparatus according to claim 10, wherein the following relation holds:

$$1.5 < (b/c) < 3.0$$

where c is a diameter of said bulb in the direction of said mirror axis of said spheroidal mirror.

14. An illuminating apparatus according to claim 13, wherein the minor axis diameter b of said spheroidal mirror and the diameter c of said bulb in the direction of said minor axis of said spheroidal mirror are related to each other as follows:

$$(b/c) = 2$$

15. An illuminating apparatus according to claim 10, wherein an entrance end portion of said light guide is disposed in a control part of said endoscope.

16. An illuminating apparatus according to claim 15, wherein a part which includes said bulb and said spheroidal mirror is detachable with respect to said control part.

17. An illuminating apparatus according to claim 16, wherein said bulb uses a battery as a power supply, said battery being detachable with respect to said control part, together with said bulb and said spheroidal mirror.

18. An illuminating apparatus of an endoscope having a bulb for supplying illuminating light to a light guide for illumination, said bulb being disposed to face an entrance end surface of said light guide, said illuminating apparatus comprising;

a spheroidal mirror for converging light emitted peripherally from said bulb in a vicinity of said entrance end surface of said light guide, said spheroidal mirror surrounding side and rear portions of said bulb, wherein said spheroidal mirror is formed such that:

$b \leq f < a$, where a is a major axis diameter, b is a minor axis diameter, and f is a distance between two foci of said spheroidal mirror; and a convex lens for allowing light emitted forward and obliquely forward from said bulb to be incident on said entrance end surface of said light guide, said convex lens being formed integrally with said bulb at a distal end of said bulb.

19. The illuminating apparatus according to claim 18, wherein:

$b:f:a=7:8:11$, where a is said major axis diameter, b is said minor axis diameter, and f is said distance between two foci of said spheroidal mirror.

20. The illuminating apparatus according to claim 18, wherein:

$1.5 < (b/c) < 3.0$, where c is a diameter of said bulb in the direction of said minor axis of said spheroidal mirror.

21. The illuminating apparatus according to claim 20, wherein:

$(b/c)=2$, where c is a diameter of said bulb in the direction of said minor axis of said spheroidal mirror.

* * * * *

UNITED STATES PATENT AND TRADEMARK OFFICE
CERTIFICATE OF CORRECTION

PATENT NO. : 5,746,494
DATED : May 5, 1998
INVENTOR(S) : T. KOEDA et al.

It is certified that error appears in the above-identified patent and that said Letters Patent is hereby corrected as shown below:

At column 8, line 38 (claim 10, line 5) of the printed patent, change "or" to ---major---.

Signed and Sealed this

Twenty-sixth Day of October, 1999

Attest:

Q. TODD DICKINSON

Attesting Officer

Acting Commissioner of Patents and Trademarks